W. F. SELLERS, C. SELLERS, Jr. & T. T. COLLINS.
BORING AND FACING MACHINE FOR BOILER HEADERS.
APPLICATION FILED JULY 1, 1909.
961,542.
Patented June 14, 1910.
3 SHEETS—SHEET 1.
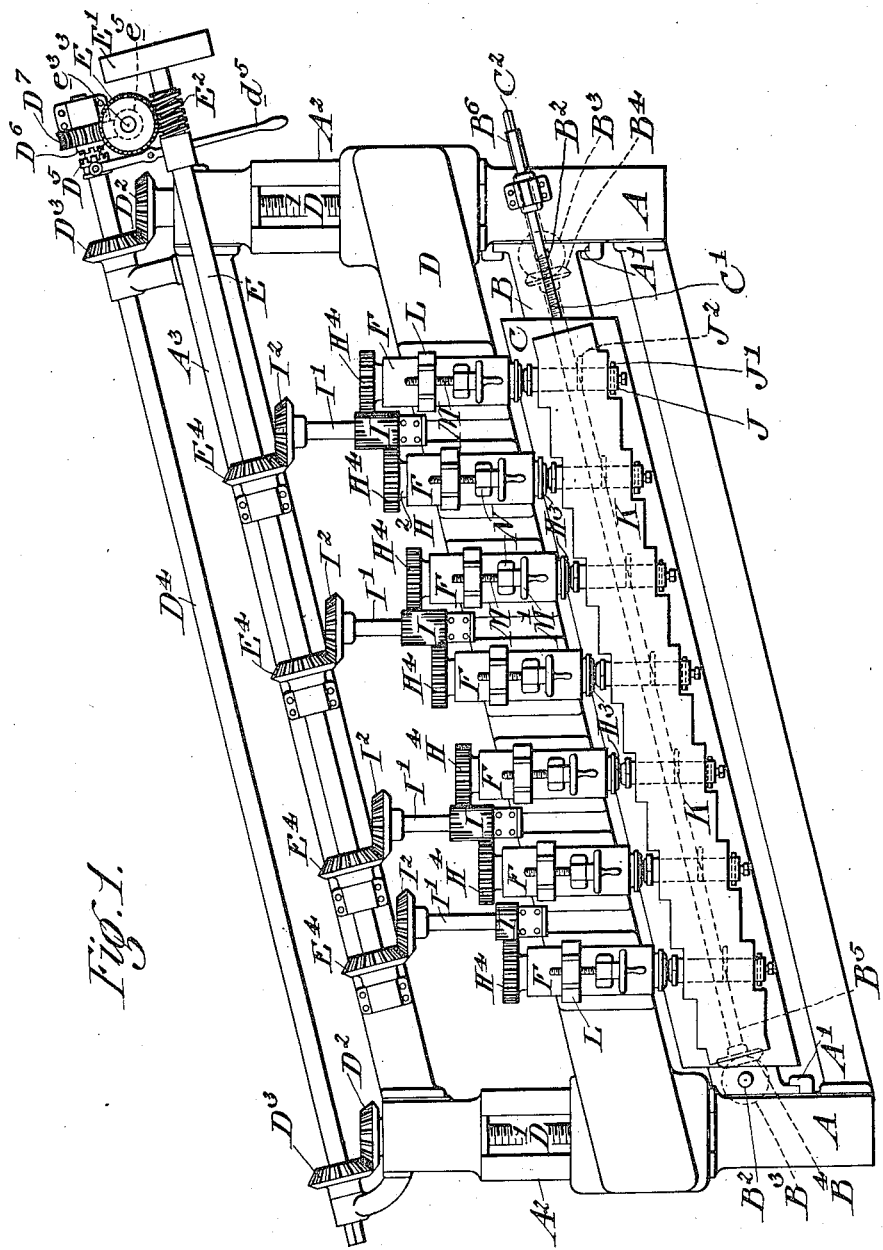
WITNESSES:
INVENTORS
ATTORNEY.

W. F. SELLERS, C. SELLERS, Jr. & T. T. COLLINS.
BORING AND FACING MACHINE FOR BOILER HEADERS.
APPLICATION FILED JULY 1, 1909.
961,542.
Patented June 14, 1910.
3 SHEETS—SHEET 2.
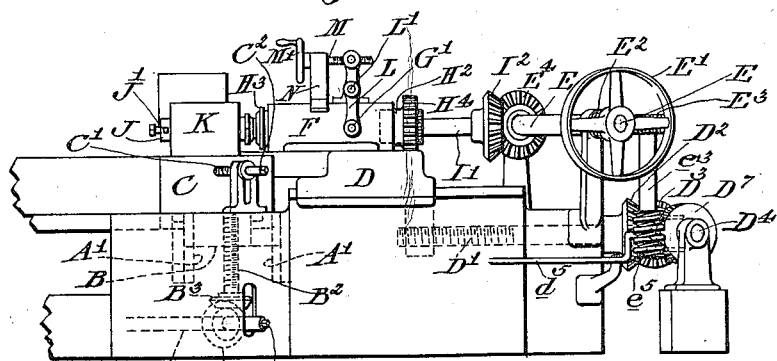
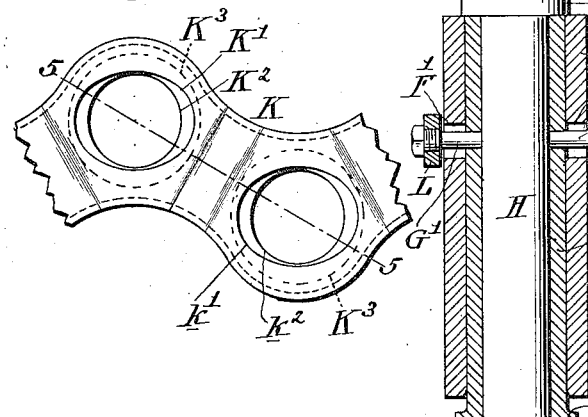
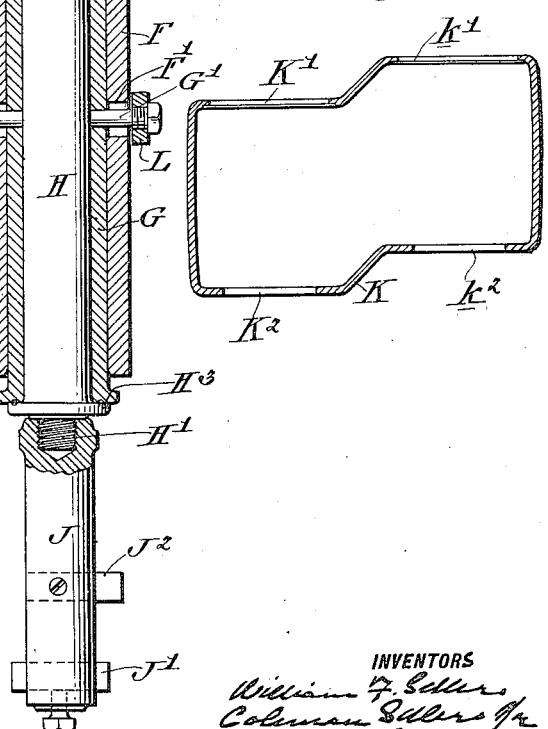
WITNESSES:
INVENTORS
ATTORNEY.

W. F. SELLERS, C. SELLERS, Jr. & T. T. COLLINS.
BORING AND FACING MACHINE FOR BOILER HEADERS.
APPLICATION FILED JULY 1, 1909.
961,542.
Patented June 14, 1910.
3 SHEETS—SHEET 3.
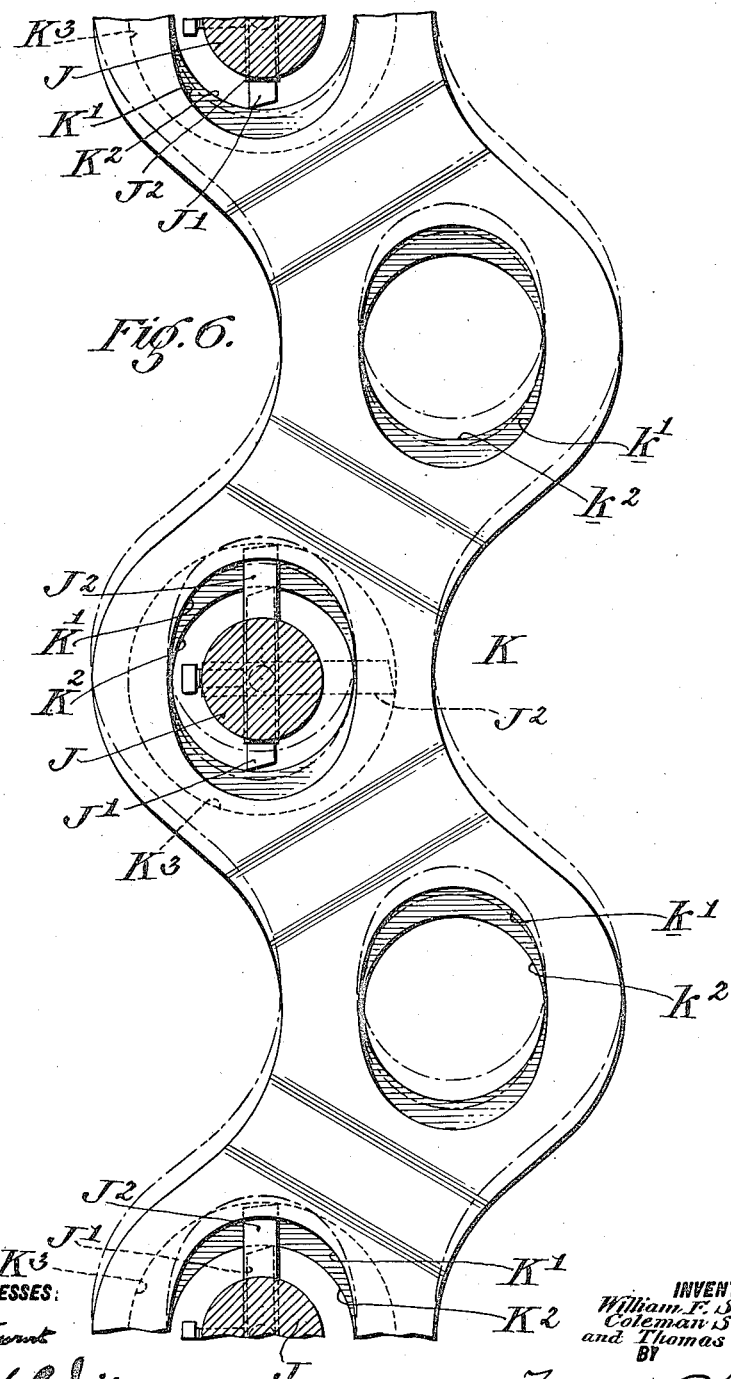

UNITED STATES PATENT OFFICE.

WILLIAM F. SELLERS, OF WILMINGTON, DELAWARE, COLEMAN SELLERS, JR., OF PHILADELPHIA, AND THOMAS T. COLLINS, OF ENFIELD, PENNSYLVANIA, ASSIGNORS TO EDGE MOOR IRON COMPANY, OF EDGE MOOR, DELAWARE, A CORPORATION OF DELAWARE.

BORING AND FACING MACHINE FOR BOILER-HEADERS.

961,542.  Specification of Letters Patent.  Patented June 14, 1910.

Application filed July 1, 1909. Serial No. 505,327.

*To all whom it may concern:*

Be it known that we, WILLIAM F. SELLERS, a resident of Wilmington, in the county of New Castle, State of Delaware, COLEMAN SELLERS, Jr., a resident of Philadelphia, in the county of Philadelphia, in the State of Pennsylvania, and THOMAS T. COLLINS, a resident of Enfield, in the county of Montgomery, in the State of Pennsylvania, all citizens of the United States of America, have invented a certain new and useful Improvement in Boring and Facing Machines for Boiler-Headers, of which the following is a true and exact description, reference being had to the accompanying drawings, which form a part thereof.

Our invention relates to a machine designed for a particular use or service, to wit, the boring of the tube holes and the facing of the hand holes in boiler headers.

Particularly our machine is designed and adapted for use in machining the staggered holes in the vertical headers of the construction shown in the drawings, which header construction forms the subject matter of the patent application filed by William F. Sellers 28th May, 1909, Serial Number 498,805. In these headers each tube hole and the corresponding, preferably oval, hand hole lie on opposite parallel surfaces of the header and the hand holes are adapted for the use of internal covers by having their inner edges faced off, and it is the object of our invention to provide for the boring of the tube holes and the internal facing of the hand holes in a rapid economical manner.

The nature of our invention will be best understood as described in connection with the drawings in which, Figure 1 is a plan view of a drilling and facing machine provided with our improvements. Fig. 2 an end elevation thereof. Fig. 3 an enlarged view of a spindle and its tools together with its guiding cylinder and sleeve shown in section. Fig. 4 is a face view of a portion of the header and Fig. 5 a section on the line 5—5 of Fig. 4. Fig. 6 is a view taken similarly to Fig. 4 and showing in full and dotted lines the spindles and facing tools in the entering and working positions respectively.

A, A, indicates the frame of the machine, A', A', vertical guideways for the work holding table support B.

$A^2$, $A^2$, are horizontal guideways for the spindle supporting bar D.

$A^3$ is a portion of the frame supporting the spindle driving shaft E.

The table support B is moved vertically or transversely to the line of the spindles by feed screws $B^2$, $B^2$, actuated through bevel wheels $B^3$ and $B^4$ by a shaft $B^5$ having a squared end $B^6$ through which it can be actuated.

C is the work holding table movable longitudinally on support B as a guideway and moved as shown by the feed screw C' having squared end $C^2$. Although for convenience, on account of the shape of the work, the table C does not extend, and move with reference to the support D, in a direction exactly at right angles to the direction of the spindle, the general direction of the table C on the support B and the movement of the table support B in its guides may be said to provide for the adjustment of the work relative to the spindles in two directions, at right angles to each other, and both transverse to the direction of the spindles.

D is the support or frame by means of which the spindles are fed to their work, it moves on the guideways $A^2$, $A^2$, and is actuated by feed screws D', D', driven through bevel wheels $D^2$, $D^3$, $D^2$, $D^3$, by shaft $D^4$, which is actuated by clutch $D^5$, $D^6$, which, when moved by lever $d^5$, connects the shaft with the main driving shaft E through worm wheel $D^7$, worm $e^5$ on shaft $e^3$, worm wheel $E^3$ and worm $E^2$.

The shaft E driven by pulley E', has attached to it bevel wheels $E^4$, $E^4$, &c., which engage bevel wheels $I^2$, $I^2$, &c., and drive the shafts I', I' &c., on which are secured the broad pinions I, I, &c.

J, J, &c., are the tool holding spindles of our machine. In each of them is secured a boring tool J', which projects equally on both sides of the spindle, and also a facing tool $J^2$, which projects from one side of the spindle and, in the case illustrated, has its cutting face on the side farthest from the boring tool. The facing tool extends farther from the center of the spindle than does the boring tool as its work is to face the inner surrounding surface of the, preferably oval, hand holes. As shown in Figs. 1 and 6, the facing tools $J^2$ and the spindles J are so arranged that the facing tools always extend parallel to each other. The spindles J are each secured by screws H' to a shaft H, having, as shown, shoulders $H^2$, $H^3$, between which is secured a bushing G. A gear wheel $H^4$ is secured to the head of the shaft and held in engagement with a pinion I as shown.

F, F, &c., are cylindrical guideways for the shafts H and bushings G. These guideways are secured to the frame D and are formed with slots F', F', through which extend pins G', G', secured to bushings G.

L, L, &c., are levers pivoted on guideways F at F". At one end they connect with the pins G and at the other end with screws M, supported on standards N, and actuated by hand wheels M'.

The header K is secured on the table C, shown in Fig. 1, and is formed with two rows of tube and hand holes $K^2$, K', $k^2$, k', each tube having a corresponding and concentric hand hole and each such pair of holes lying in opposite parallel surfaces of the header as shown.

$K^3$ represents the surface faced at the margin of each of the holes K', k'.

By preference we secure the header on the table C so that the surface containing the hand holes will be next to the spindles. When the header is being secured to the table the frame D is retracted so that the spindles will not interfere with the placing of the header and then one row of holes, for example, those marked $K^2$, K', are brought into approximately concentric registration with the spindles. In doing this the support B is raised or lowered so as to bring the holes to the proper vertical level, and then the table C, is shifted by its feed screw to effect the necessary horizontal registration. The frame D, carrying with it the spindles, is then, through the screws D', and actuating mechanism described, moved toward the header until the boring tools J' have passed through the hand holes K'. It is then necessary to move the table C transversely to the spindles to bring the latter to one side of the centers of the corresponding holes $K^2$ and K', to permit the facing tools to pass through the holes K'. Where the holes being faced are oval the facing tools should ordinarily be brought into, or near, parallelism with the longer axes of the holes and where, as is usual, the holes K' are elongated in the direction of the rows in which they extend, the facing tools $J^2$ should be brought into the same plane at the time of entrance, as shown in Fig. 6. In Fig. 6 the header K and spindles $J^2$ are shown in the working positions in full lines. The dotted line position of the header K in Fig. 6 is that in which the tools $J^2$ when in the full line position may be entered into the work, by the longitudinal adjustment of the table C on the support B. When the facing tools have passed through the hand holes the table C is again shifted to bring the holes concentric with the spindles J and the tools are then further fed forward until the boring tools J' enter the tube holes $K^2$ and in passing through them bore them for the reception of the tubes. The frame D and the tool spindles are then retracted until the edges of the facing tools $J^2$ are in contact with the under side of the metal surrounding the hand holes K' and the tools are then actuated to face off the underside of these hand holes. It is preferable, in doing the actual work, not to depend on the feed of the frame D, and for this reason we supply the hand feeding mechanism consisting of the screw M actuated by the hand wheel M' and acting through the lever L and the spindle J on the shaft H. The boring and facing of each hole being thus nicely controlled by hand after the common feed mechanism acting through the frame D has brought the tools into operative position.

It will be readily understood by those skilled in the art that our invention is not limited to the specific form and arrangement of the parts shown. We consider it preferable to have the spindles lying horizontally and to have the facing tools situated as shown with reference to the boring tool on the spindle, but the important features of the invention are those by which we are enabled by a series of spindles each having a boring and facing tool to accomplish the described boring and facing of the tube and hand holes and conveniently introduce and retract the spindles and tools.

Having now described our invention, what we claim as new and desire to secure by Letters Patent is,

1. A boring and facing machine for boiler headers having in combination a series of spindles each spindle having a boring tool secured to it and a facing tool extending out radially from it, the facing tools of the series of spindles being set parallel to each other; means for rotating and feeding said spindles, a work holding table and means for shifting said table transversely to said spindles so as to enable the facing tools to be entered into and withdrawn from the header.

2. A boring and facing machine for boiler headers having in combination a series of spindles each spindle having a boring tool secured to it near its end and facing tool extending out radially from it, and having its cutting edge set in the direction away from the end of the spindle, the facing tools of the series of spindles being set parallel to each other, means for rotating and feeding said spindles, a work holding table and means for shifting said table transversely to said spindles so as to enable the facing tools to be entered into and withdrawn from the header.

3. A boring and facing machine for boiler headers having in combination a series of spindles each spindle having a boring tool secured to it and a facing tool extending out radially from it, said facing tools of the series of spindles being set parallel to each other, means for rotating the spindles simultaneously, means for feeding the spindles to their work simultaneously, means for feeding each spindle to its work independently, a work holding table and means for shifting said table transversely to said spindles so as to enable the facing tools to be entered into and withdrawn from the header.

4. A boring and facing machine for boiler headers having in combination a series of spindles each having a boring tool secured to it and a facing tool extending radially from it, said facing tools of the series of spindles being set so as to be parallel to each other, means for rotating the spindles simultaneously, means for feeding the spindles to their work simultaneously, means for feeding each spindle to its work independently, a work holding table and means for shifting said table parallel to the direction in which the facing tools extend when said tools are in the same plane so as to enable the facing tools to be entered and withdrawn from the header, and means for shifting the table transversely to said direction, whereby different rows of holes may be brought into line with the spindles.

WM. F. SELLERS.
COLEMAN SELLERS, Jr.
THOMAS T. COLLINS.

Witnesses:
ARNOLD KATZ,
D. STEWART.